United States Patent
Leonard et al.

(10) Patent No.: US 9,110,268 B2
(45) Date of Patent: Aug. 18, 2015

(54) CABLE PULLING GRIP HAVING TOOLLESS REMOVAL

(71) Applicants: Ronald Alan Leonard, Connelly Springs, NC (US); Matthew Wade Smith, Lenoir, NC (US); Wesley Allan Yates, Lenoir, NC (US)

(72) Inventors: Ronald Alan Leonard, Connelly Springs, NC (US); Matthew Wade Smith, Lenoir, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 465 days.

(21) Appl. No.: 13/657,178

(22) Filed: Oct. 22, 2012

(65) Prior Publication Data

US 2013/0134370 A1     May 30, 2013

Related U.S. Application Data

(60) Provisional application No. 61/565,150, filed on Nov. 30, 2011.

(51) Int. Cl.
*G02B 6/44* (2006.01)
*H02G 1/08* (2006.01)

(52) U.S. Cl.
CPC .............. *G02B 6/4465* (2013.01); *H02G 1/081* (2013.01); *Y10T 29/49826* (2015.01)

(58) Field of Classification Search
CPC ....... H02G 1/083; H02G 1/088; H02G 1/081; H02G 1/08; G02B 6/4465; G02B 6/46; G02B 6/44
USPC ................................... 254/134.3 R, 134.3 FT
See application file for complete search history.

(56) References Cited

U.S. PATENT DOCUMENTS

| | | | |
|---|---|---|---|
| 4,514,005 A | 4/1985 | Fallon | |
| 4,601,507 A | 7/1986 | Fallon | |
| 5,133,583 A | 7/1992 | Wagman et al. | |

(Continued)

FOREIGN PATENT DOCUMENTS

| | | |
|---|---|---|
| EP | 1 308 763 | 5/2003 |
| EP | 1 406 104 | 4/2004 |

(Continued)

OTHER PUBLICATIONS

International Search Report and Written Opinion of the International Searching Authority, issued in corresponding PCT Application No. PCT/US2012/066922, filed Nov. 29, 2012, dated Feb. 27, 2013.

(Continued)

*Primary Examiner* — Lee D Wilson
*Assistant Examiner* — Nirvana Deonauth

(57) ABSTRACT

A combination of a pulling grip assembly and a fiber optic cable assembly for installing the fiber optic cable, including:
   a flexible grip having an open loop region for pull-force engagement and a closed region engaged with the strength member in a fiber optic cable assembly;
   a first heat shrunk member positioned about a portion of the distal end of the fiber optic cable assembly and the distal end of cable; and
   a second heat shrunk member positioned about a portion of the closed region of the flexible grip and the proximal end of the fiber optic cable assembly.
A method of using the pulling grip assembly and a quick release pulling grip kit for installing fiber optic cable, as defined herein, are also disclosed.

13 Claims, 2 Drawing Sheets

(56) References Cited

U.S. PATENT DOCUMENTS

| | | | |
|---|---|---|---|
| 7,672,562 B1 | 3/2010 | Fandl et al. | |
| 8,009,957 B2 | 8/2011 | Utz et al. | |
| 2008/0247719 A1* | 10/2008 | Cody et al. | 385/114 |
| 2012/0328253 A1* | 12/2012 | Hurley et al. | 385/103 |

FOREIGN PATENT DOCUMENTS

| | | |
|---|---|---|
| EP | 2 216 666 | 8/2010 |
| GB | 2 187 305 | 9/1978 |
| GB | 2 271 333 | 4/1994 |
| JP | 2002-333561 | 11/2002 |
| JP | 2007 062825 | 3/2007 |
| JP | 2011 148029 | 8/2011 |
| WO | 2013/009936 | 1/2013 |

OTHER PUBLICATIONS

Springer et al., "Improved three-dimensional optical model for thin-film silicon solar cells"; Journal of Applied Physics, vol. 96, No. 9, Nov. 2004, pp. 5329-5337.

* cited by examiner

CABLE PULLING GRIP HAVING TOOLLESS REMOVAL

CROSS-REFERENCE TO RELATED APPLICATIONS

This application claims the benefit of priority under 35 U.S.C. §119 of U.S. Provisional Application Ser. No. 61/565,150, filed on Nov. 30, 2011, the content of which is relied upon and incorporated herein by reference in its entirety.

BACKGROUND

1. Field of the Disclosure

The technology of the disclosure relates to methods of preparing pulling members in fiber optic cable furcations, and related components, assemblies, and cables. The pulling members are configured to direct at least part of a pulling load on non-medium components of a fiber optic cable.

2. Technical Background

Pulling grips are used on fiber optic cables during installation to protect the end of the cable, which cabling may include pre-terminated connectors, and to transfer the pulling load to the fiber optic cable. Removal of existing pulling grips may require tools.

SUMMARY

In embodiments, the disclosed pulling grip assembly enables tool-less removal of the pulling grip from cabling. In embodiments, the disclosed pulling grip assembly provides a first glue lined heat shrunk member for easy rip-and-tear removal of the grip at a trunk base, and second glue lined heat shrunk member for easy rip-and-tear removal of the grip in a pulling grip region. The pulling grip region uses a suitable pull cord layered or bonded on itself to fashion a loop for pulling a preformed cable loop or like connection point, and a portion of the grip is surrounded and bonded to the glue lined second heat shrunk member. The heat shrunk member can optionally have perforations that direct tear force down the sides of the heat shrunk member around the pulling grip when the grip is pulled apart in opposite directions yet remain intact when the grip is pulled in opposite directions.

DETAILED DESCRIPTION

Figure 1:
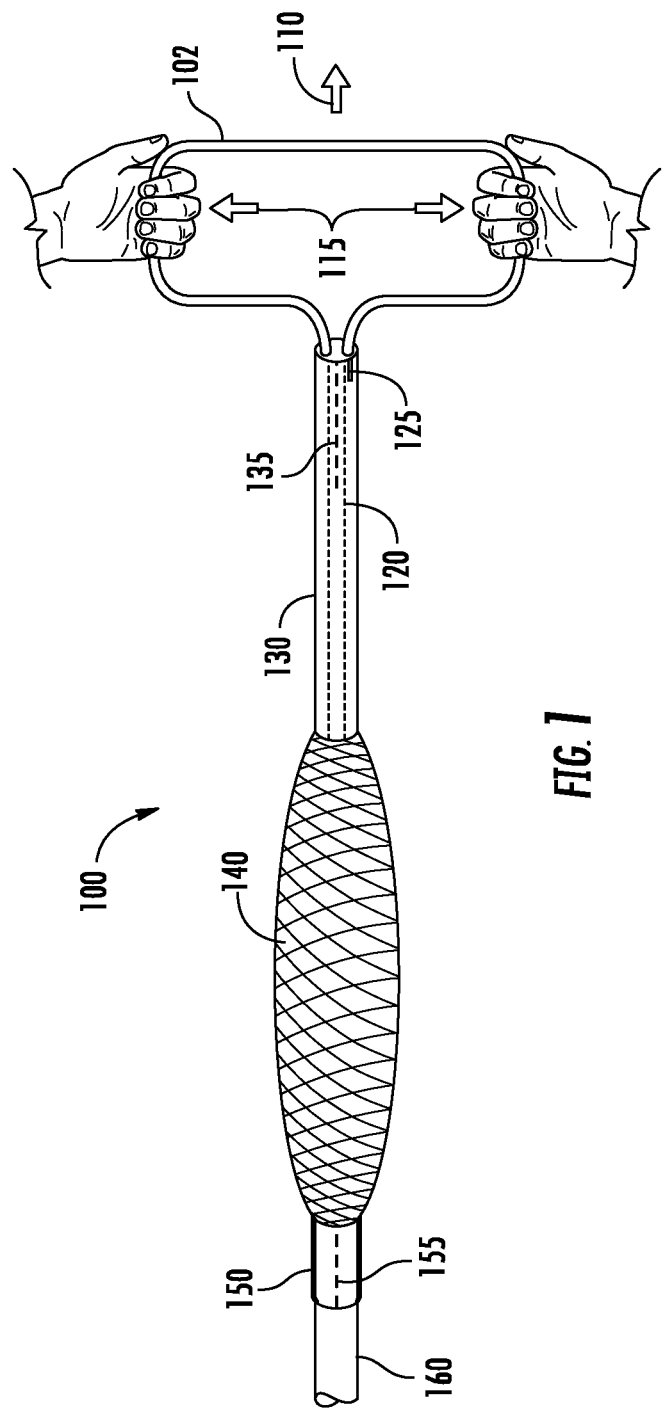
FIG. 1 schematically shows the disclosed pulling grip engaged to an installed cable assembly and manually engaged for removal.

Reference will be made in detail to the embodiments, examples of which are illustrated in the accompanying drawings, in which some, but not all embodiments are shown. The concepts may be embodied in many different forms and should not be construed as limiting herein; rather, these embodiments are provided so that this disclosure will satisfy applicable legal requirements. Whenever possible, like reference numbers are used to refer to like components or parts.

Embodiments disclosed in the detailed description include:

a combination of a pulling grip assembly and a fiber optic cable assembly for installing the fiber optic cable;

a method of installing the pulling grip assembly in the pulling grip assembly and fiber optic cable assembly combination;

a method of using the pulling grip assembly and fiber optic cable assembly combination to installing fiber optic cable; and a quick release pulling grip kit for installing fiber optic cable.

In embodiments, the disclosure provides a combination of a pulling grip assembly and a fiber optic cable assembly for installing the fiber optic cable, comprising:

a flexible grip having an open loop region for pull-force engagement, for example, by hand or machine, and a closed region engaged with the strength member in a fiber optic cable assembly;

a first heat shrunk member positioned about a portion of the distal end of the fiber optic cable assembly and the distal end of cable; and a second heat shrunk member positioned about a portion of the closed region of the flexible grip and the proximal end of the fiber optic cable assembly.

In the combination, the second heat shrunk member can include, for example, one or more perforations on the heat shrunk member's end nearest to the open region of the grip to, for example, further facilitate removal of the second heat shrunk member after pulling installation use. The second heat shrunk member can optionally include, for example, a notch at the junction of the open loop region and the closed region of the pulling grip. The notch, if present, can further facilitate tool-less separation and removal of the second heat shrunk member from the pulling grip assembly. If desired, the second heat shrunk member can be positioned about the entire length of the closed region of the flexible pulling grip.

The flexible grip can be, for example, at least one of an adhesive tape, a flatenable woven tape, a rope, a flat rope, a cord, a wire, a wire cable, and like materials and configurations, or a combination thereof.

In the combination, the fiber optic cable assembly can include, for example: a strength member comprising a pulling loop; and a cover sleeve that covers and protects a portion of a fiber optic cable assembly and for engagement by the first and second heat shrunk members.

In embodiments, the disclosure provides a method of installing the pulling grip assembly in the aforementioned combination, comprising:

attaching the flexible grip (102) to the strength member in the fiber optic cable assembly, for example, a pre-formed pulling loop, to form the pulling grip (102a);

heating the first heat shrinkable member to form the first heat shrunk member (150) and to secure the cable and the fiber optic cable assembly to a portion of the pulling grip assembly; and heating the second heat shrinkable member to form the second heat shrunk member (130) and to secure the second heat shrinkable member to a portion of the flexible grip (102b) and the fiber optic cable assembly.

The heating of the first and second heat shrinkable members can be accomplished, for example, at from about 65° C. (150° F.) to about 315° C. (600° F.), and from about 148° C. (300° F.) to about 260° C. (500° F.), including intermediate values and ranges. The heating of the first and second heat shrinkable members can be accomplished at other suitable temperature so long as the resulting heat shrunk members are adequately engaged and fix the respective components of the fiber optic assembly and the pulling grip assembly. In embodiments, using high heat (e.g., about 500° F.) to shrink the second heat shrinkable member having heat activated glue into place can be used. In embodiments, using lower heat (e.g., about 300° F.) to shrink the first shrinkable member into place can be advantageous to avoid overheating or causing the perforations in the first shrinkable member to split.

In embodiments, the disclosure provides a method of using the aforementioned combination, for installing fiber optic cable, comprising:

pulling the fiber optic cable with the end of the pulling grip (102a) in an approximately co-linear direction (110) to position the cable in a desired installation location; and removing the pulling grip from the pulling grip assembly by simultaneously pulling on side portions of the open region of the pulling grip (102a) in opposing directions (115) and approximately perpendicular to the co-linear pull direction.

The pulling of the fiber optic cable assembly with the pulling grip, removing the pulling grip, or both, can be accomplished manually or mechanically.

The removal of the pulling grip from the pulling grip assembly and fiber optic cable combination can be accomplished, for example, manually and without the use of any tools. Avoiding tools provides speed, convenience, and avoids tool damage to the fiber optic cable assembly (work piece). Removing the pulling grip from the pulling grip assembly can be accomplished, for example, within about 10 seconds to 5 minutes, including intermediate time intervals and ranges. The removal time interval can vary depending on a number of factors, such as the number of legs or fiber counts in the fiber optic assembly, the operator experience, and like considerations.

In embodiments, the disclosure provides a quick release pulling grip kit for installing fiber optic cable, comprising:

a flexible member (102) and a fastener (105), for example, adhesive tape pieces or like or equivalent faster material, for fashioning a flexible pulling grip (102a), wherein a portion of the flexible member (102b) when in use engages a pullable strength member, for example, a pulling loop cable (170), in a fiber optic cable assembly;

a first heat shrinkable member (150), for securing the first end of a cover sleeve (140) covering a portion of a fiber optic cable assembly to the cable (160);

a second heat shrinkable member (130) having an optional adhesive on its inner surface, for securing the second end of a cover sleeve (140) and a portion of the flexible pulling grip (102b); and instructions for pulling grip installation, pulling grip use, and tool-less removal of the pulling grip from the installed fiber optic cable.

The instructions can be, for example, printed, electronically recorded, graphically illustrated, and like media formats and presentations, or combinations thereof. The instructions can recite, illustrate, or a combination thereof, for example, assembly steps, installation steps, removal steps, or a combination thereof. For example removal step instructions can include, for example:

rip the grip, that is ripping the pulling grip apart to separate and break loose the second heat shrunk member, and rip the first heat shrink, that is ripping the first heat shrunk member at the perforations, if present, to separate and break up the first heat shrunk member from the assembly;

slide off any covers from covering the fiber optic cable assembly, and slip off the pulling grip, that is removing the pulling grip from the strength member, such as the pulling loop.

The first heat shrinkable member in the kit can include axial perforations (155) to facilitate tool-less removal of the first heat shrinkable member from the fiber optic cable assembly after use.

The second heat shrinkable member (130) in the kit can further include having axial perforations (135) to facilitate tool-less removal of the second heat shrinkable member and the pulling grip from the fiber optic cable assembly after use. The second heat shrinkable member (130) in the kit can further include having an end notch (125) to facilitate tool-less removal of the second heat shrinkable member and the pulling grip from the fiber optic cable assembly after use.

The kit can further include a first cover sleeve member, for example, a split tube; (not shown), for fashioning a protective cover around, for example, the pullable strength member and cable legs of the cable assembly. The kit can also further include a second cover sleeve (140), that is, a mesh or plastic dust cover, or like material or member for fashioning a cover around the first protective cover and for engaging the first and second heat shrunk members in the complete pulling assembly when in use.

In embodiments, advantages of the disclosed pulling grip design, the methods of installation and removal, and the kit can include, for example:

a heat shrinkable or shrunk member that covers a portion of the grip can be perforated at or near the grip loop, which arrangement allows the pull cord to direct load to the strength member of the cable when the cord or grip is pulled co-linearly for installation, but also allows rip-apart removal of the pulling grip from the cable via the perforations and optionally one or more notches when the cord or grip is pulled in approximately opposite directions and approximately perpendicular to the collinear pull direction;

the pulling grip and assembly design enables very quick removal, e.g., from seconds to several minutes, and tool-less removal of the pulling grip, which can save time and avoids operator injury that can otherwise occur with the use of tools;

the pulling grip design is inexpensive; and the pulling grip design avoids the risk of tool damage to the cable or fiber components by avoiding using tools during removal.

One method of making perforations on either of the heat shrinkable members can use, for example, a paper perforation wheel to perforate the heat shrinkable member material prior to grip assembly. The disclosed pre-perforated heat shrinkable members are desirable because they offer a more consistent and easy to use process. Another method of making perforations on the heat shrinkable members uses, for example, wire strippers or like clamping and cutting device to perforate the heat shrink member material, for example, prior to packaging the heat shrinkable members in the aforementioned kit or prior to constructing the pulling grip assembly for sale or use.

Related commonly owned and assigned copending applications: U.S. Ser. No. 13/181,785, filed Jul. 13, 2011, entitled "METHODS OF PREPARING STRENGTH MEMBER PULLING MEMBERS IN FIBER OPTIC CABLE FURCATIONS AND RELATED COMPONENTS, ASSEMBLIES, AND FIBER OPTIC CABLES"; U.S. Ser. No. 13/181,840, filed Jul. 13, 2011, entitled "FIBER OPTIC CABLE MOUNTING ADAPTERS, AND RELATED FIBER OPTIC CABLE ASSEMBLIES AND METHODS"; and U.S. Ser. No. 13/165,974, filed Jun. 22, 2011, entitled "MULTI-FIBER, FIBER OPTIC CABLE ASSEMBLIES PROVIDING CONSTRAINED OPTICAL FIBERS WITHIN AN OPTICAL FIBER SUB-UNIT, AND RELATED FIBER OPTIC COMPONENTS, CABLES, AND METHODS," mention, for example, fashioning strength pulling members in conjunction with fiber optic cable assemblies.

The aforementioned U.S. Ser. No. 13/181,785, mentions that to allow fiber optic cables to be pulled without damaging optical fiber(s) disposed therein, a strength member pulling loop is formed from a strength member disposed inside the fiber optic cable. A pulling cord can be disposed in the strength member pulling loop to pull the fiber optic cable. The pulling load applied to the pulling cord is translated to the strength member pulling loop, which is translated to the strength member disposed inside the fiber optic cable. In this manner, when the fiber optic cable is pulled, the pulling load is translated to the strength member disposed inside the fiber optic cable to prevent or avoid damaging the optical fiber(s) disposed inside the fiber optic cable. This prior disclosure provides a method of preparing a strength member pulling loop assembly in a fiber optic cable furcation. The method can include, for example, removing a portion of a cable jacket from an end portion of a fiber optic cable to expose end portions of one or more optical fibers and an end portion of a strength member from the cable jacket. This method also includes forming a strength member loop by disposing a first end of the strength member end portion back towards the cable jacket to place a loop portion in the strength member end portion. This method can also include securing the first end of the strength member end portion to form a strength member pulling loop. The disclosed method can also include several options. As non-limiting examples, the strength member end portion can be secured onto the cable jacket of the fiber optic cable or inside a furcation plug. For example, the method can include the option of disposing the strength member end portion in at least one tube before forming the strength member loop. The tube can comprise heat shrinkable tube that can be heat shrunk around the strength member end portion to provide the strength member loop. Alternatively, the method can include the option of disposing the first end of the strength member end portion in a first tube, and disposing the first end of the strength member end portion through a second tube after disposing the strength member end portion through the first tube, before forming the strength member loop. The option can include disposing the first end of the strength member end portion back through a first tube portion in the first tube to form a neck portion from the first tube and dispose the loop portion in the second tube, and disposing the first end of the strength member end portion back towards the cable jacket.

EXAMPLES

The following examples serve to more fully describe the manner of using the disclosure, and to further illustrate and demonstrate specific examples of best modes contemplated for carrying out various aspects of the disclosure. These examples do not limit the scope of the disclosure, but rather are presented for illustrative purposes.

Example 1

Preparing and Attaching a Pulling Grip for Cable Installation

An exemplary procedure used to make the pulling grip follows.

Cut a piece of pull cord (e.g., flat woven polyester tape (e.g., MULETAPE®, available from NEPTO Co., Rhode Island)) at 128" for a 47" leg length (for other lengths subtract twice the difference (43" legs would be 8" less of pull cord equals 120"). An exemplary schedule for cutting pull cord length based on the length and number of legs is listed in Tables 1 and 2.

TABLE 1

Cord Length Dimensions for 24" Base Leg Length.

| Legs | Nominal Leg Length (including 3" rework to L) | | Pull Cord Length |
|---|---|---|---|
| | in | mm | in |
| 1 & 2 | 27 | 686 | 88 |
| 3 & 4 | 31 | 787 | 96 |
| 5 & 6 | 35 | 889 | 104 |
| 7 & 8 | 39 | 991 | 112 |
| 9 & 10 | 43 | 1092 | 120 |
| 11 & 12 | 47 | 1194 | 128 |

TABLE 2

Cord Length Dimensions for 36" Base Leg Length.

| Legs | Nominal Leg Length (including 3" rework to L) | | Pull Cord Length |
|---|---|---|---|
| | in | mm | in |
| 1 & 2 | 39 | 991 | 112 |
| 3 & 4 | 43 | 1092 | 120 |
| 5 & 6 | 47 | 1194 | 128 |
| 7 & 8 | 51 | 1295 | 136 |
| 9 & 10 | 55 | 1397 | 144 |
| 11 & 12 | 59 | 1499 | 152 |

Figure 2:
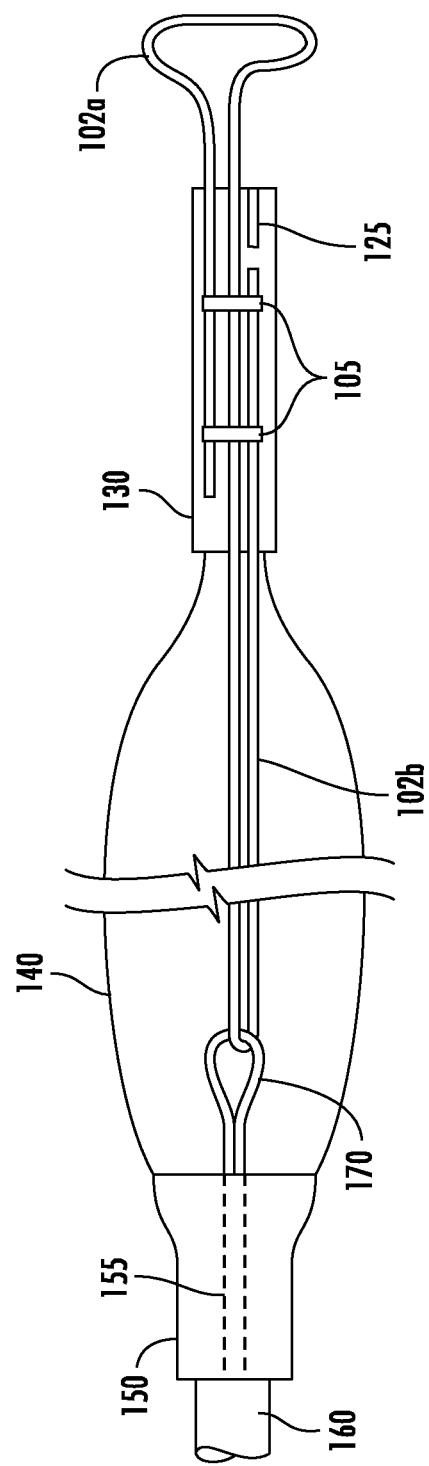
FIG. 2 schematically shows aspects of the disclosed pulling grip in cross-section illustrating, in embodiments, the engagement of the pulling grip with a cable pulling loop.

Feed the pull cord through the strength member pulling loop (170), also known as a furcation, as shown in FIG. 2.

Place the first heat shrinkable furcation over the tape measure at "0". Then pull one end of the pull cord to 7" inches from the last pair of connectors.

Take the other end of the pull cord and fold back until it overlaps over the pull cord placed at 7" inches and stop at 3" from the last pair of connectors. See the elongated and overlapping "S" pattern of the pull cord (102) shown in FIG. 2.

Place a piece of adhesive tape, for example, masking tape, or like fastener, directly on each end of the pull cord. See fasteners (105) as applied and shown in FIG. 2.

If a piece of split tube was not placed on the fiber optic cable assembly trunk during the above furcation process, cut a piece of the split tube, for example, according to the formula: Split Tube=Longest Leg+7", and place the split tube piece on the trunk behind the furcation.

Slide the split tube member carefully around the strain relief member (i.e., a strain relief or hardware strain relief) allowing the strain relief to be exposed in the split opening of the split tube.

Slide the split tube until the longest legs of the connectors are enclosed in the tube, ensuring the pairs of connectors are hanging out.

Place the connectors one at a time in stacked parallel pairs until all the connectors are enclosed within the split tubing.

If a piece of protective cover material was not placed on the trunk during the furcation process, cut a piece of the protective cover material (e.g., polyester expandable mesh, also known as the expando mesh) according to the formula:

protective cover material Length=Longest Leg+12"

and slide the piece of protective cover material over the split tube until it extends past the heat shrink furcation. Otherwise slide the protective cover material over the split tube.

Place the protective cover material 1" from the first piece of masking tape joining traversing segments of the pulling grip, fold the protective cover material in half over the pull cord, and lock in position with vise grips or a similar clamping tool.

Slide a 5.75 inch long cylindrical piece of heat shrinkable member (e.g., perforated tubing) having a heat activateable adhesive or glue on the interior surface of the heat shrinkable member on and over the near end of the protective cover material and lock the other end of the heat shrinkable member in position with another clamping tool, and ensure that the pulling cord has no twists or turns inside the region to be covered by the second heat shrinkable member.

Use high heat (e.g., about 500° F.) to shrink the second heat shrinkable member into place, and immediately roll out the second heat shrunk member with a rigid member, such as a plastic or metal rod, to push the activated glue into the pull cord material surrounded by the second heat shrunk member.

Make two notches (125) on opposite sides of the grip end of the second heat shrunk member with scissors.

Place a piece of masking tape around the distal end of the protective cover material and the cable to secure the cover to the cable and to alleviate cover material fraying, and slide the first heat shrinkable member (150) having perforations (155) over protective cover mesh allowing one half inch of the first shrinkable member to cover the cable and the rest of the first shrinkable member over the protective cover material.

Use low heat (e.g., about 300° F.) and shrink the first shrinkable member into place carefully, and ensuring not to overheat and cause the perforations in the first shrinkable member to split.

Example 2

In alternative embodiments, one problem with using perforated heat shrinkable members (a.k.a., heat shrinks) is that they can easily break at the perforations during shrinking if too much heat is applied. A solution to this excess heating problem can be, for example: to cover the perforations on the heat shrinkable members with a removable protective tape that has some heat resistance. After shrinking the heat shrinkable members, the protective tape can be removed.

In alternative embodiments, it is possible to use a ripcord under the perforated portion of either of the heat shrunk members to further facilitate removal of either of the heat shrunk members for the assembly.

Example 3

Demonstration of Separating or Removal of the Pulling Grip

By pulling apart the grip in the direction of the arrows (115) shown in FIG. 1, the pre-formed notch (125) allows tears to propagate down the side of the heat shrunk member (130). The notch can be near, or preferably aligned with, the perforations (135) on the heat shrunk member (130). While being pulled in the course of normal cable installation, the load (110) is at the end of the loop (102a) so there is no lateral load on the grip to propagate tears of the heat shrunk member. The grip stays together during installation and allows for the transmission of high loads, but can be easily removed without excessive force.

The description and claims are not to be limited to the specific embodiments disclosed, and modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of installing a pulling grip assembly on a fiber optic cable assembly that includes a cable, the method comprising:
    placing a cover sleeve over a portion of the fiber optic cable assembly;
    attaching a flexible grip to a strength member of the cable in the fiber optic cable assembly to form the pulling grip assembly, wherein the flexible grip has an open loop region for pull-force engagement and a closed region engaged with the strength member;
    heating a first heat shrinkable member that is positioned about a portion of a distal end of the cable and a first end of the cover sleeve to secure the cover sleeve to the fiber optic cable; and
    heating a second heat shrinkable member that is positioned about a portion of the closed region of the flexible grip and a second end of the cover sleeve to secure the second heat shrinkable member to a portion of the flexible grip and the cover sleeve.

2. The method of claim 1 wherein the second heat shrunk member includes one or more perforations on the heat shrunk member's end nearest to the open loop region of the grip.

3. The method of claim 1 wherein the second heat shrunk member includes a notch at the junction of the open loop region and the closed region of the pulling grip.

4. The method of claim 1 wherein the second heat shrunk member is positioned about the entire length of the closed region of the flexible grip.

5. The method of claim 1 wherein the flexible grip comprises at least one of an adhesive tape, a flatenable woven tape, a rope, a flat rope, a cord, a wire, a wire cable, or a combination thereof.

6. The method of claim 1 wherein heating the first and second heat shrinkable members is accomplished at from about 65° C. (150° F.) to about 315° C. (600° F.).

7. The method of claim 1 wherein heating the first and second heat shrinkable members is accomplished at from about 148° C. (300° F.) to about 260° C. (500° F.).

8. The method of claim 1, for installing fiber optic cable, comprising: pulling the fiber optic cable with the end of the pulling grip in an approximately co-linear direction to position the cable in a desired installation location; and removing the pulling grip from the pulling grip assembly by simultaneously pulling on side portions of the open region of the pulling grip in opposing directions and approximately perpendicular to the co-linear pull direction.

9. The method of claim 8 wherein pulling the fiber optic cable with the pulling grip, removing the pulling grip, or both, are accomplished manually or mechanically.

10. The method of claim 8 wherein removing the pulling grip from the pulling grip assembly and fiber optic cable combination is accomplished manually and without the use of any tools.

11. The method of claim 8 wherein removing the pulling grip from the pulling grip assembly is accomplished within about 10 seconds to 5 minutes.

12. The method of claim 1 wherein the cover sleeve comprises a split tube.

13. The method of claim 1 wherein the cover sleeve comprises a mesh cover.

* * * * *